United States Patent
Au

(10) Patent No.: US 7,778,445 B2
(45) Date of Patent: Aug. 17, 2010

(54) METHOD AND SYSTEM FOR THE DETECTION OF REMOVED OBJECTS IN VIDEO IMAGES

(75) Inventor: Kwong Wing Au, Bloomington, MN (US)

(73) Assignee: Honeywell International Inc., Morristown, NJ (US)

( * ) Notice: Subject to any disclaimer, the term of this patent is extended or adjusted under 35 U.S.C. 154(b) by 1106 days.

(21) Appl. No.: 11/449,217

(22) Filed: Jun. 7, 2006

(65) Prior Publication Data

US 2007/0286482 A1    Dec. 13, 2007

(51) Int. Cl.
*G06K 9/00* (2006.01)
*G06K 9/34* (2006.01)

(52) U.S. Cl. ...................... 382/103; 382/173

(58) Field of Classification Search .......... 382/100, 382/103, 164, 171.173, 181, 199, 236, 256, 382/260, 165, 224, 225; 345/427; 352/57, 352/66; 348/128, 148, 143, 153, 169, 152, 348/156, 699
See application file for complete search history.

(56) References Cited

U.S. PATENT DOCUMENTS

| | | | |
|---|---|---|---|
| 6,064,400 A | 5/2000 | Wrey | 345/440 |
| 6,151,363 A | 11/2000 | Burl et al. | 375/240.17 |
| 6,172,687 B1 | 1/2001 | Kitamura et al. | 345/516 |
| 6,690,374 B2 | 2/2004 | Park et al. | 345/427 |
| 6,757,434 B2 | 6/2004 | Miled et al. | 382/236 |
| 6,798,412 B2 * | 9/2004 | Cowperthwaite | 345/428 |
| 6,987,451 B2 | 1/2006 | McKeown et al. | 340/541 |
| 2002/0141637 A1 | 10/2002 | Brodsky et al. | |
| 2003/0081564 A1 | 5/2003 | Chan | 370/328 |

(Continued)

FOREIGN PATENT DOCUMENTS

EP    0805405 A2    5/1997

(Continued)

OTHER PUBLICATIONS

Andrea Colombari, Vittorio Murino, Marco Cristani, Andrea Fusiello, Exempllar-based Background Model Initialization, Proceeding of the third ACM International Workshop on Video Surveillance and Sensor Network, pp. 29-36, Nov. 11, 2005, ACM 1-59293-242-9/05/0011.*

(Continued)

*Primary Examiner*—Samir A Ahmed
*Assistant Examiner*—Mehdi Rashidian
(74) *Attorney, Agent, or Firm*—Kermit D. Lopez; Kevin L. Soules; Kris T. Fredrick

(57) ABSTRACT

A method, system and program product for the detection of removed objects in video images is disclosed. An object (or objects) is within a fixed camera's FOV (Field of View), is designated to be monitored. If an object is not designated, an algorithm can be used to segment and identify all the objects in the image that is acquired by a fixed camera. In such case, all these objects can be monitored. A reference frame around the monitored object that also includes the surrounding background can be determined. The object can be extracted out of the reference frame, thereby creating a "reference with hole" image and an object reference image. The hole in the "reference with hole" image can be filled by either an in-painting algorithm or a texture synthesis algorithm depending on the complexity of the surrounding background.

20 Claims, 6 Drawing Sheets

U.S. PATENT DOCUMENTS

| | | | |
|---|---|---|---|
| 2003/0174210 A1 | 9/2003 | Vimpari et al. | 348/152 |
| 2003/0210818 A1 | 11/2003 | Abousleman et al. | 382/199 |
| 2004/0091158 A1 | 5/2004 | Miled et al. | 382/236 |
| 2004/0151355 A1 | 8/2004 | Yokota et al. | 382/128 |
| 2004/0189801 A1 | 9/2004 | Chang | 348/143 |
| 2004/0257444 A1 | 12/2004 | Maruya et al. | 348/169 |
| 2005/0047646 A1* | 3/2005 | Jojic et al. | 382/159 |
| 2005/0078853 A1 | 4/2005 | Buehler et al. | |
| 2005/0094994 A1 | 5/2005 | Paolantonio et al. | 396/427 |
| 2005/0162268 A1 | 7/2005 | Grindstaff et al. | 340/531 |
| 2005/0162515 A1 | 7/2005 | Venetianer et al. | 348/143 |
| 2005/0225635 A1 | 10/2005 | Meitzler et al. | 348/148 |

OTHER PUBLICATIONS

J. Connell, A.W. Senior, A. Hampapur, Y. L. Tian. L. Brown, S. Pankantil, "Detection and Tracking in the IBM PeopleVision System", IBM T.J. Watson Research Center, IEEE International Conference on Multimedia and Expo, 2004, pp. 1403-1406, 0-7803-8603-5/04.*

*Texture Synthesis by Non-parametric Sampling*; A.A. Efros, T.K. Leung; IEEE International Conference on Computer Vision, Corfu, Greece, Sep. 1999.

*Optical Image Reconstruction Based on the Third-Order Diffusion Equations*; H. Jiang; Apr. 12, 1999/vol. 4, No. 8/Optics Express.

*Region Filling and Object Removal by Exemplar-Based Image Inpainting*; A. Criminisi, P. Perez, K. Toyama; IEEE Transactions on Image Processing, vol. 13, No. 9, Sep. 2004.

*Image Inpainting*; M. Bertalmio and G. Sapiro, Electrical and Computer Engineering, University of Minnesota; V. Caselles and C. Ballester, Escola Superior Politecnica, Universitat Pompeu Fabra.

Andrea Colombari; Image-based Techniques for View Synthesis and Video Editing; Apr. 11, 2006, Ph.D. Thesis-Universita Degli Studi Di Verona, XP002495568.

Criminski, A. et al.; Region Filling and Object Removal by Examplar-Based Image Inpainting; IEEE Transactions on Image Processing, IEEE Service Center, Piscataway, NJ, US, vol. 13, No. 9; Sep. 1, 2004, pp. 1200-1212, XP011116342; ISSN: 1057-7149.

PCT—Notification of Transmittal of the International Search Report and the Written Opinion of the International Searching Authority, or the Declaration, Date of Mailing Jun. 10, 2008.

* cited by examiner

US 7,778,445 B2

METHOD AND SYSTEM FOR THE DETECTION OF REMOVED OBJECTS IN VIDEO IMAGES

TECHNICAL FIELD

Embodiments are generally related to data-processing methods and systems. Embodiments are additionally related to video image processing methods and systems. Embodiments also relate to the detection of removed objects in video images.

BACKGROUND OF THE INVENTION

Security systems are finding an ever increasing usage in monitoring installations. Such systems can range from one or two cameras in a small location (e.g., a store) or up to hundreds or thousands of cameras covering a large mall, building, airport, military installation and so forth. In general, such systems display video signals as discrete individual pictures on a number of display panels. When there are a large number of cameras, greater than the number of display panels, the systems can possess a control means that changes the input signal to the displays so as to rotate the images and scan the entire video coverage within a predetermined time frame. Such systems also usually have mechanisms for stopping the progression of the image sequence to allow for the study of a particular area of interest. Such systems have proved useful in monitoring areas and frequently result in the identification of criminal activity.

The use of video cameras in security and surveillance systems typically involves some form of video image processing, including a detection of a region of interest (ROI) within a field of view of an imaging camera (e.g., video camera). Detecting an ROI in images is a common feature of many image processing software applications. Conventional digital image recognition software routines, for example, are capable of detecting an ROI. Generally, an image is composed of many objects that can be defined by pixels. A group of pixels can be referred to as a "region". A group of pixels that belongs to a specific object that an operator is interested in is generally referred to as a "region of interest". A target can be referred to as an "object of interest". Some examples of regions of interest and targets include, for example, human, vehicles and faces. In one example, a prototype may contain information about a region of interest as related to a type of target. An image-processing component may therefore detect a region in an image that matches the prototype.

Algorithmic video image processing software applications, as required by many security and surveillance application, typically detect the presence of a target in video images. The movement of the target may further be monitored via tracking. Conventional approaches typically detect the target using segmentation, feature extraction and classification processes. The segmentation process, which can be edge-based or region growing based, extracts the outlines of the objects in the image. Feature extraction computes the discriminatory characteristics of the extracted segment. Finally, the classification process evaluates the features and determines whether the segmented object is a target of interest.

Some prior art video image processing systems involve the detection of an abandoned object. Such image processing systems monitor the background of the image area. Tracking of the movement of people, along with blob-based object detection and comparison with a known background can determine the presence or absence of an abandoned object. In such applications, the image processing system detects an additional object in the background. Note that the background that is free of the abandoned object can be acquired from previous frames.

Some security and surveillance applications may transmit an alert when a high value object, such as a painting, jewelry, or an antique is removed from a display or a site. One detecting device is a video camera, which constantly captures the images of the object and determines if the object is in the images or not. In such applications, the target of interest is known, while the background, which the target shields, may not be known.

Some prior art image processing technique often apply change detection approaches. Such techniques or systems typically establish a reference background (e.g., target-reference image), part of which contains the target of interest. Subsequent images can be compared with this target-reference image to determine whether or note the target remains in the images. Change detection is not robust, particularly with respect to lighting changes or shadows. Some prior art image processing techniques improve change detection capabilities using learning or adaptation, such as adaptive thresholds. One serious problem with using change detection approaches for such an application is the risk of false alarms due to occlusion. When a viewer partially occludes the monitored object from the camera's field of view; the change-detection-based monitoring system detects a significant change and the disappearance of the target of interest. Thus, such a system often generates an alarm.

It is believed that a need therefore exists for an improved image processing video imaging and surveillance method and system that overcomes these problems. Such an improved, robust, removed-object-detection method and system that is immune to environmental changes and occlusion is described in greater detail herein.

BRIEF SUMMARY

The following summary is provided to facilitate an understanding of some of the innovative features unique to the embodiments disclosed and is not intended to be a full description. A full appreciation of the various aspects of the embodiments can be gained by taking the entire specification, claims, drawings, and abstract as a whole.

It is, therefore, one aspect of the present invention to provide for improved image-processing methods and systems, including a program product thereof.

It is another aspect of the present invention to provide for a technique for the detection of removed objects in video images.

The aforementioned aspects and other objectives and advantages can now be achieved as described herein. A method, system and program product for the detection of removed objects in a video image is disclosed. An object (or objects) that is within a fixed camera's FOV (Field of View), is designated to be monitored. If an object is not designated, an algorithm can be used to segment and identify all the objects in the image that is acquired by a fixed camera. In such case, all these objects can be monitored. A reference frame around the monitored object that also includes the surrounding background can be determined.

The object can be extracted out of the reference frame, thereby creating a "reference with hole" image and an object reference image. The hole in the "reference with hole" image can be filled by either an in-painting algorithm or a texture synthesis algorithm depending on the complexity of the surrounding background. In-painting algorithm, which requires more computations, is preferred for complex background and texture synthesis is preferred for simple background. The result of the hole filling procedure is a reference background image that is used for matching the input image for object removal detection. The object reference image can be compared with the corresponding pixels in the input image for possible occlusion of the object. The reference images will be periodically updated or when update request is received. The "reference with hole" image can be compared with the corresponding region in the input image for any environmental change (e.g., in illumination). When an environmental change is detected, a reference background update request is issued.

BRIEF DESCRIPTION OF THE DRAWINGS

The accompanying figures, in which like reference numerals refer to identical or functionally-similar elements throughout the separate views and which are incorporated in and form a part of the specification, further illustrate the embodiments and, together with the detailed description, serve to explain the embodiments disclosed herein.

DETAILED DESCRIPTION

The particular values and configurations discussed in these non-limiting examples can be varied and are cited merely to illustrate at least one embodiment and are not intended to limit the scope thereof.

Note that the embodiments disclosed herein can be implemented in the context of a host operating system and one or more software modules. Such a host operating system may constitute a computer or an embedded controller, depending upon design considerations and goals. Such modules may constitute hardware modules, such as, for example, electronic components of a computer system. Such modules may also constitute software modules. In the computer programming arts, a software module can be typically implemented as a collection of routines and data structures that performs particular tasks or implements a particular abstract data type.

Figure 1:
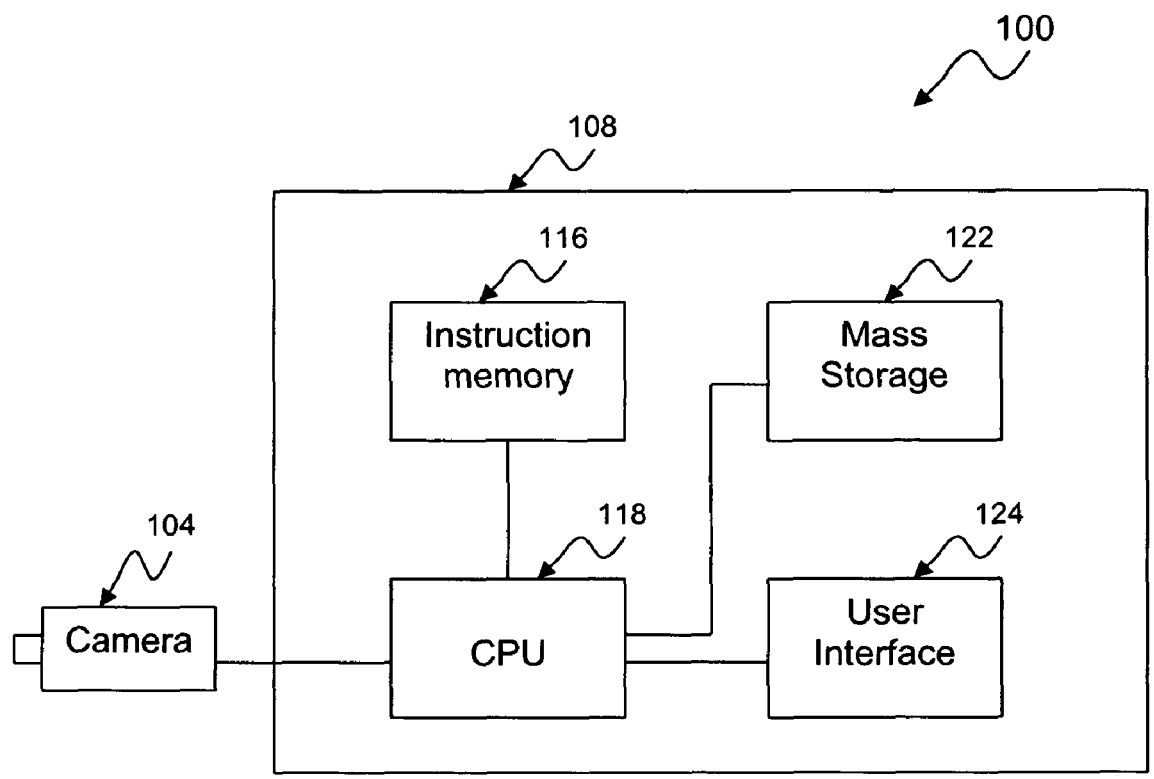
FIG. 1 illustrates a block diagram of a representative data-processing apparatus for the detection of removed objects in video images in which a preferred embodiment can be implemented.

FIG. 1 illustrates a block diagram depicting a data-processing apparatus or system 100 for the detection of removed objects in video images in accordance with a preferred embodiment. The system 100 generally comprises one or more cameras 104 that output digital images of one or more surveillance areas. The camera 104 transmits a video feed to a processing system 108. Processing system 108 includes an instruction memory 116 for storing and providing software instructions to a central processing unit 118 for execution. The central processing unit 118 operates on the digital data stream from the camera 104 in accordance with these instructions so as to analyze the incoming images to produce useful results (e.g., such as an object of interest is removed from the scene).

The processor 108 can further include a mass storage device 122, such as a hard disk, for storing the video images and/or the output information. In addition, a user interface 124 can be provided so that an operator may interact with the system 100. For instance, the user interface typically may comprise a computer monitor, keyboard, and/or computer mouse device. System 100 can thus be implemented as a data-processing apparatus.

In a preferred embodiment, however, a software implementation (e.g., a program product) can be utilized. It is understood, however, that software is not a limitation of the present invention, which can be implemented in any reasonable fashion, including firmware, hardware, software, or any combinations thereof.

Regarding software implementations, some embodiments may be implemented in the context of modules, which generally comprise instruction media storable within a memory location of a data-processing apparatus and are typically composed of two parts. First, a software module may list the constants, data types, variable, routines and the like that can be accessed by other modules or routines. Second, a software module can be configured as an implementation, which can be private (i.e., accessible perhaps only to the module), and that contains the source code that actually implements the routines or subroutines upon which the module is based. The term module, as utilized herein can therefore refer to software modules or implementations thereof. Such modules can be utilized separately or together to form a program product that can be implemented through signal-bearing media, including transmission media and recordable media.

It is important to note that, although the embodiments are described in the context of a fully functional data-processing apparatus or system 100 such as a computer, those skilled in the art will appreciate that the mechanisms of the present invention are capable of being distributed as a program product in a variety of forms, and that the present invention applies equally regardless of the particular type of signal-bearing media utilized to actually carry out the distribution. Examples of signal bearing media include, but are not limited to, recordable-type media such as floppy disks or CD ROMs and transmission-type media such as analogue or digital communications links.

Figure 2:
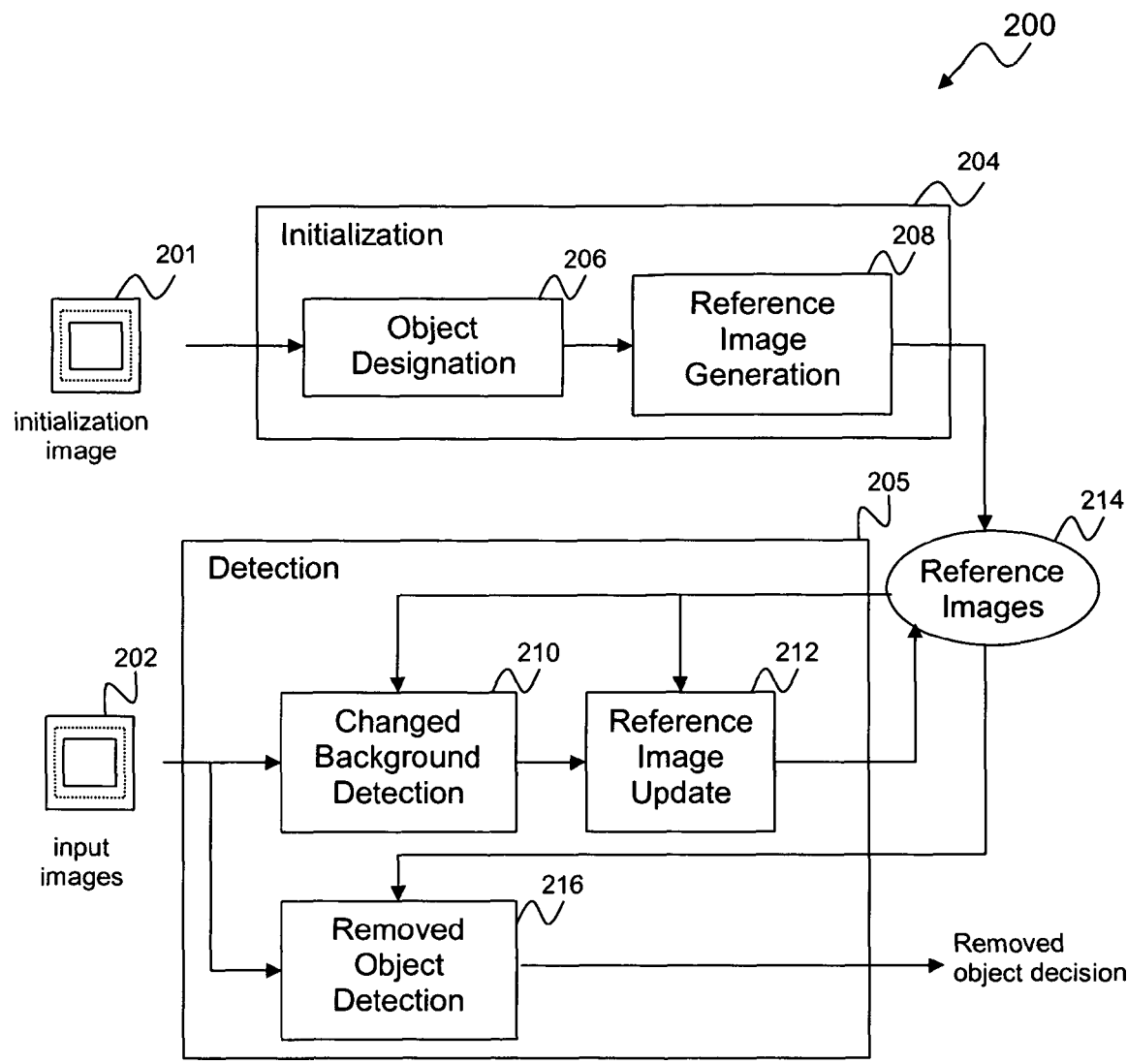
FIG. 2 illustrates a block diagram of an object removal detection system for the detection of removed objects in video images in accordance with a preferred embodiment.

FIG. 2 illustrates a block diagram of an object removal detection system 200 for the detection of removed objects in a video image in accordance with a preferred embodiment. System 200 includes an initialization module 204 and a detection module 205. Through an interface, the initialization module 204 takes an input initialization image 201 (e.g., color, gray level or multi-spectral) into the system 200 and generates two reference images 214. The initialization process first performs an object designation 206, which specifies the objects to be monitored as identified by a user or as stationary objects cued by automated software.

Once the objects are designated, the reference image generation module 208 segments the objects and fills in the voids, creating an object reference image and a background reference image. Segmentation of objects can be accomplished manually or by automated software. The reference images 214 can be sent to the detection unit 205, which performs a removed object decision based on comparisons with subsequent input images 202 in the removed object detection module 216. The detection unit 205 also performs a changed background detection 210, which detects whether or not the background has changed due to changes in its environmental conditions. If the background has changed, then the detection unit 205 invokes the reference image update module 212, which revises the signatures in the reference images 214

Figure 3:
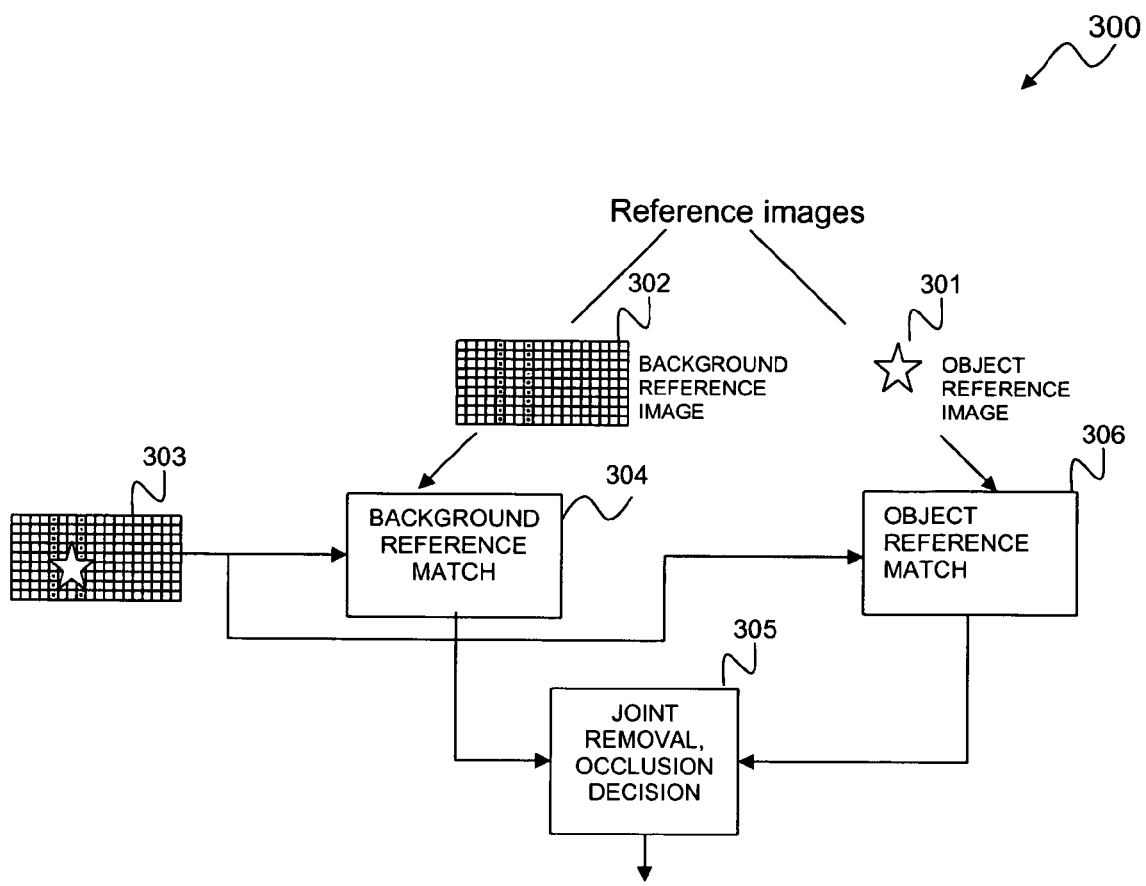
FIG. 3 illustrates a block diagram of the detailed detection process of the system for the detection of removed objects in video images in accordance with a preferred embodiment.

FIG. 3 illustrates a block diagram of a system 300 for the detection of removed objects in a video image in accordance with a preferred embodiment. System 300 includes the results of the reference image generation 208 or reference image update 212 that incorporates the creation of two reference images: background reference image 302, and object reference image 301. The input image 303 is send to the background reference match 304 which determines if the monitored object is removed by comparison between the reference background image 302 and the input image 303. The input image 303 is also sent to the object reference match 306 which determines if the monitored object is partially, totally occluded or not occluded via a comparison with the object reference image 301. Both results from the background reference match and the object reference match are forwarded to the joint removal occlusion decision operation 305 which logically fuses them in making a final decision determining whether the monitored object is removed, occluded or still present.

Figure 4:
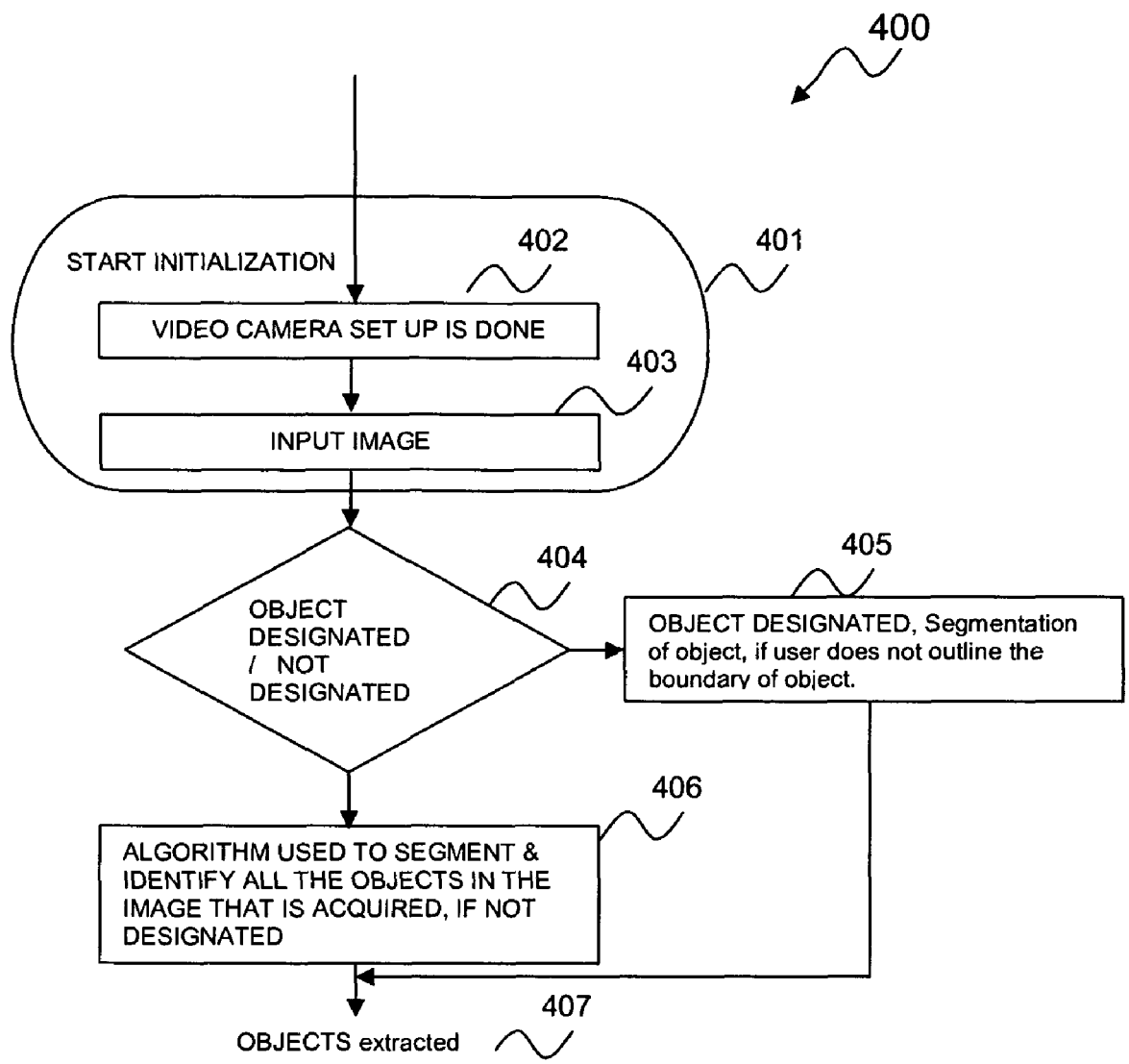
FIG. 4 illustrates a high-level flow chart of operations illustrating logical operational steps for extracting the object out of the set-up frame for the detection of removed objects in video images in accordance with a preferred embodiment.

Referring to FIG. 4, a high-level flow chart 400 of operations is illustrated depicting logical operational steps for extracting the object out of the reference frame for the detection of removed objects in video images in accordance with a preferred embodiment. As depicted at block 401, initialization, where, as indicated at block 402, the video camera can be set up for surveillance, and for inputting the image into the system as indicated in block 403, can occur. An input setup image can be acquired during the initialization process. The next process is generally based on the condition of the monitored object whether the object is designated or not designated as indicated at block 404.

If the object is designated by user through a GUI (Graphical User Interface), the object can be then segmented from the input setup image as depicted at block 405. If the object is not designated, an algorithm can be used to segment and identify all the objects in the acquired image as indicated in block 406. Then the configuration can be accomplished for both the designated and non-designated object as the objects are extracted as depicted in 407.

Figure 5:
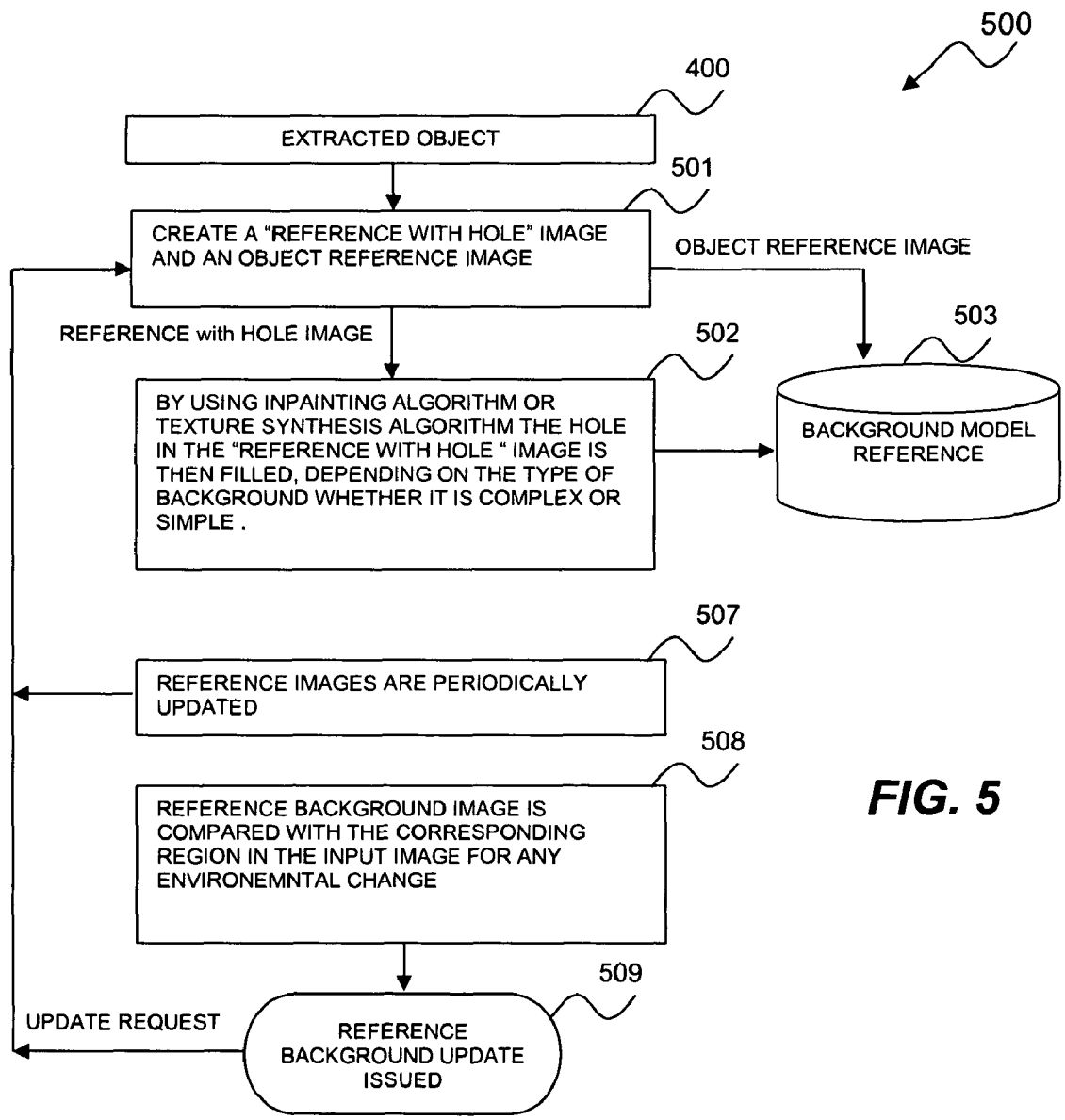
FIG. 5 illustrates a high-level flow chart of operations illustrating logical operational steps for creating the reference images, which include an object reference image and a background reference image for the detection of removed objects in video images in accordance with a preferred embodiment.

Referring to FIG. 5, a high-level flow chart 500 of operations is illustrated depicting logical operational steps for creating the reference images, which is generally composed of an object reference image and a background reference image for the detection of removed objects in a video image, in accordance with a preferred embodiment. The extracted object(s), as indicated at block 400, can be carved out in the initial set-up image. The results are a "reference with hole" image and an object reference image as depicted at block 501. The hole, which is the void of the monitored object in the "reference with hole" image, can be filled by either an inpainting algorithm or a texture synthesis algorithm depending on the complexity of the surrounding background as indicated in block 502. An in-painting algorithm, which requires additional computations, is preferred for complex backgrounds and a texture synthesis algorithm is preferred for simple backgrounds. The reference images can be stored in a background model reference as indicated in block 503.

The reference background image can be used for matching the input images for object removal detection as described at block 304. Thereafter, as described at block 306, the object reference image can be compared with the corresponding pixels in the input image for possible occlusion of the object.

The reference images can be periodically updated as depicted at block 507 or updated when an update request is received. The reference background image can be compared with the corresponding pixels that are proximate to the monitored object in the input image for any environmental change (e.g., in illumination) as described at block 508. When an environmental change is detected, a reference background update can be issued as indicated at block 509.

Figure 6:
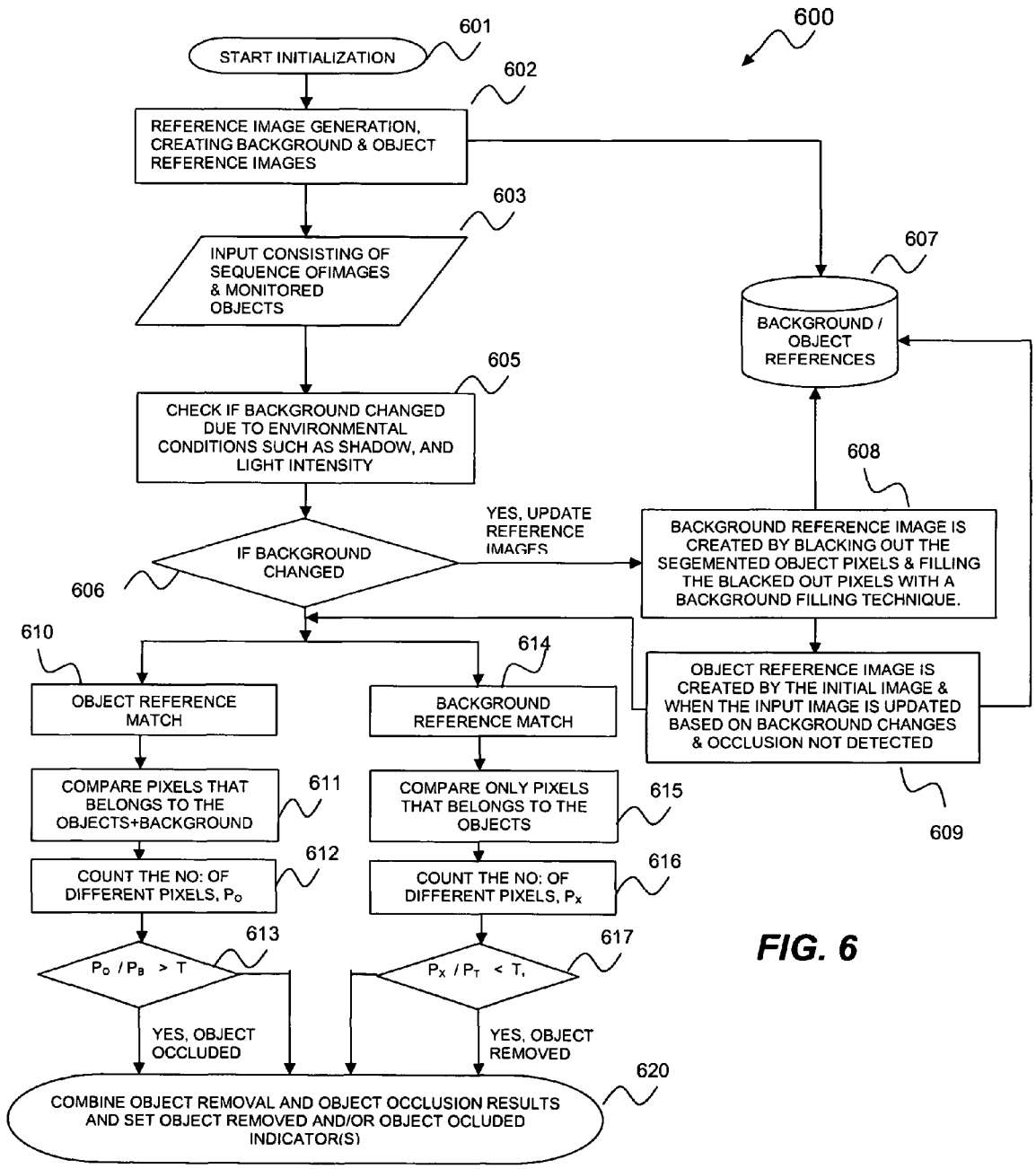
FIG. 6 illustrates a high-level flow chart of operations illustrating logical operational steps for the analysis of the background reference image for the detection of removed objects in video images in accordance with a preferred embodiment.

Referring to FIG. 6, a flow chart 600 of operations is illustrated depicting logical operational steps for the analysis of the detection of removed objects in video images in accordance with a preferred embodiment. As depicted at block 601, initialization can occur. Segmented objects to be monitored can be identified by a user or designated as a stationary object cued by automated software. The segmentation of objects can be accomplished manually or by automated software. Next as depicted at block 602, a process of reference image generation can be implemented, which results in the creation of two reference images background reference image and an object reference image. Thereafter, as indicated in block 603, an input image from a sequence of images (e.g., color, or gray level captured by a video camera) is processed to detect whether the monitored object(s) is removed.

Following processing of the operation depicted at block 605, a checking operation can be accomplished determining if the background changed due to environmental conditions, such as, for example, shadow and/or light intensity. When the background characteristics change, removal and occlusion may not be detected. In such a case, the input image can be used to update the reference images. If the background did change as indicated in block 606, then an operation can be performed to update the references images. Thereafter, as described in block 608, a background reference image can be created by blacking out the segmented object pixels, thereby filling the blacked-out pixels utilizing a background filling technique. In addition, as indicated at block 609, an object reference image can be created with object pixels identified at the initial image. These reference images can be stored in the memory, as depicted at block 607.

Following processing of the operation depicted at block 610, an operation for the object reference match can be accomplished. The object reference match can be obtained in order to compare only pixels that belongs to the objects and proximate background, e.g. $abs(In-Ref_B)>T_1$ or $T_2<In/Ref_B<T_3$, where In is the input pixel and $Ref_B$ is the background reference pixel. As depicted in block 611, pixels that belong to the object(s) and proximate background are compared. The number of different pixels, PO, can be counted as indicated at block 612. If $P_o/P_B>T_O$, as depicted at block 613, then the object occlusion indicator can be set, where $P_B$ is the total number of object pixels plus the number of proximate background pixels In addition, as depicted at block 614 the background reference match can be obtained with the similar process as the object reference match by comparing only pixels that belongs to the objects (e.g., $abs(In-Ref_O)>T_4$ or $T_5<In/Ref_O<T_6$, where the parameter In represents the input object pixel and the value $Ref_O$ represents the object pixel in background reference image) as described at block 615, thereby counting the number of different pixels as indicated at block 616. If $P_x/P_T<T_R$, as depicted at 617, then the object removed indicator can be set, where the variable $P_T$ represents the total number of object pixels.

The results of the background reference match and the object reference match are combined to yield the final object removed and/or object occluded decision as depicted at block 620. Overlapped and non-overlapped locations of the pixels identified by the background reference match and by the object reference match will be analyzed to further disambiguate the occlusion and removal decision.

In summary, the present invention can be implemented as a system, method and/or program product for detecting a removed object(s) in one or more video images. A general methodology is described below:

1. Three references images (i.e., reference hole image, object reference image, and reference background image) are generated from an initial reference frame. Thereafter, these reference images are used to compare the input images to detect whether the monitored object has been removed, occluded or remains present.
2. The object reference image is then compared with the input images to detect occlusion.
3. The reference background image is then compared with the input images to detect removal.
4. The results of 2 and 3 above are combined to make the final removal and occlusion decision.
5. The reference background image can be generated from the reference hole image by filling it utilizing an in-painting algorithm or a texture synthesis algorithm.
6. The reference images are updated periodically or due to an environmental change, which is detected by comparison of the reference hole image with the input images.

It will be appreciated that variations of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

What is claimed is:

1. A method for detecting a removed object in video images, comprising:
   designating at least one object to be monitored within a field of view of an imaging camera associated with a data-processing apparatus;
   providing a reference frame with respect to said at least one object; and
   extracting said object from said reference frame to generate a reference hole image, a reference background image and an object reference image, wherein said reference background image and said object reference image are compared to at least one subsequent input image in order to determine a change with respect to the at least object to be monitored, thereby providing an indication of whether or not said at least object has been subject to a removal or an occlusion from said field of view.

2. The method of claim 1 further comprising:
   filling said reference hole image utilizing an in-painting algorithm or a texture synthesis algorithm and generating said reference background image.

3. The method of claim 1 further comprising:
   comparing said reference background image with at least one corresponding pixel in an input image for an object removal detection.

4. The method of claim 3 further comprising:
   comparing said object reference image with at least one corresponding pixel in an input image for an occlusion of said at least one object.

5. The method of claim 4 further comprising:
   combining said object removal detection and said occlusion of said at least one object to generate a fused occlusion, removal decision.

6. The method of claim 1 further comprising:
   periodically updating said object reference image, said reference background image and said reference hole image; and
   updating said object reference image, said reference background image and said reference hole image, in response to receiving an update request due to an environmental change.

7. The method of claim 1 further comprising comparing said reference hole image with a corresponding region in an input image in order to detect an environmental change.

8. A system for detecting a removed object in video images, comprising:
   a data-processing apparatus;
   a module for executed by said data-processing apparatus, said module and said data-processing apparatus being operable in combination with one another to:
   designate at least one object to be monitored within a field of view of an imaging camera associated with a data-processing apparatus;
   provide a reference frame with respect to said at least one object; and
   extract said object from said reference frame to generate a reference hole image, a reference background image and an object reference image, wherein said reference background image and said object reference image are compared to at least one subsequent input image in order to determine a change with respect to the at least object to be monitored, thereby providing an indication of whether or not said at least object has been subject to a removal or an occlusion from said field of view.

9. The system of claim 8 wherein said module and said data-processing apparatus are operable in combination with one another to:
   fill said reference hole image utilizing an in-painting algorithm or a texture synthesis algorithm and generating said reference background image.

10. The system of claim 8 wherein said module and said data-processing apparatus are operable in combination with one another to:
    compare said reference background image with at least one corresponding pixel in an input image for an object removal detection.

11. The system of claim 10 wherein said module and said data-processing apparatus are operable in combination with one another to:
    compare said object reference image with at least one corresponding pixel in an input image for an occlusion of said at least one object.

12. The method of claim 11 wherein said module and said data-processing apparatus are operable in combination with one another to:
    combine said object removal detection and said occlusion of said at least one object to generate a fused occlusion, removal decision.

13. The system of claim 8 wherein said module and said data-processing apparatus are operable in combination with one another to:

periodically update said object reference image, said reference background image and said reference hole image; and update said object reference image, said reference background image and said reference hole image, in response to receiving an update request due to an environmental change.

14. The system of claim 8 wherein said module and said data-processing apparatus are operable in combination with one another to:

compare said reference hole image with a corresponding region in an input image in order to detect an environmental change.

15. A computer-readable program-product residing in a memory in a computer for detecting a removed object in video images, comprising:

instruction media residing in a computer for designating at least one object to be monitored within a field of view of an imaging camera associated with a data-processing apparatus;

instruction media residing in a computer for providing a reference frame with respect to said at least one object; and instruction media residing in a computer for extracting said object from said reference frame to generate a reference hole image, a reference background image and an object reference image, wherein said reference background image and said object reference image are compared to at least one subsequent input image in order to determine a change with respect to the at least object to be monitored, thereby providing an indication of whether or not said at least object has been subject to a removal or an occlusion from said field of view.

16. The program product of claim 15 further comprising:

instruction media residing in a computer for filling said reference hole image utilizing an in-painting algorithm or a texture synthesis algorithm and generating said reference background image.

17. The program product of claim 15 further comprising:

instruction media residing in a computer for comparing said reference background image with at least one corresponding pixel in an input image for an object removal detection.

18. The program product of claim 17 further comprising:

instruction media residing in a computer for comparing said object reference image with at least one corresponding pixel in an input image for an occlusion of said at least one object.

19. The program product of claim 18 further comprising:

instruction media residing in a computer for combining said object removal detection and said occlusion of said at least one object to generate a fused occlusion, removal decision.

20. The program product of claim 15 further comprising:

instruction media residing in a computer for periodically updating said object reference image, said reference background image and said reference hole image; and instruction media residing in a computer for updating said object reference image, said reference background image and said reference hole image, in response to receiving an update request due to an environmental change.

* * * * *